(12) United States Patent
Chen

(10) Patent No.: US 8,788,183 B2
(45) Date of Patent: Jul. 22, 2014

(54) ENGINE IDLE SPEED CONTROL SYSTEM AND METHOD FOR VEHICULAR GEAR

(75) Inventor: Chun-Hsiung Chen, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 375 days.

(21) Appl. No.: 13/193,078

(22) Filed: Jul. 28, 2011

(65) Prior Publication Data

US 2012/0029796 A1 Feb. 2, 2012

(30) Foreign Application Priority Data

Jul. 29, 2010 (TW) .............................. 99125161 A

(51) Int. Cl.
*F02N 11/08* (2006.01)
*F02N 11/00* (2006.01)

(52) U.S. Cl.
USPC ....................................... 701/112; 123/179.4

(58) Field of Classification Search
USPC ............ 701/110, 112, 113; 123/179.4, 179.5, 123/179.3, 179.16, 179.17, 179.18
See application file for complete search history.

(56) References Cited

U.S. PATENT DOCUMENTS

| 6,267,706 B1 * | 7/2001 | Kuroda et al. ................. 477/107 |
| 6,532,926 B1 * | 3/2003 | Kuroda et al. ............. 123/179.4 |
| 2002/0074173 A1 * | 6/2002 | Morimoto et al. ........... 180/65.2 |

FOREIGN PATENT DOCUMENTS

JP 2003148309 A * 5/2003 .............. F02N 11/08

* cited by examiner

*Primary Examiner* — Mahmoud Gimie
(74) *Attorney, Agent, or Firm* — Muncy, Geissler, Olds & Lowe, P.C.

(57) ABSTRACT

An engine idle speed control system and a method for a vehicular gear are provided. The system includes an electronic controller, an engine connected to an ignition unit and a fuel supply unit, a battery, a starter switch connected to the battery, and a starter motor connected to the starter switch. The engine has a gear mechanism and a clutch which is connected to a clutch lever. The electronic controller is connected to a vehicle speed sensor, a throttle position sensor, and an engine revolution speed sensor. The clutch lever with a node switch provides a lever node control signal, the gear mechanism with a gear node switch provides a gear node control signal, and the electronic controller is connected to the node switch of the clutch lever and the gear node switch of the gear mechanism, so as to control automatic idle speed stop and start of the engine.

5 Claims, 14 Drawing Sheets

ENGINE IDLE SPEED CONTROL SYSTEM AND METHOD FOR VEHICULAR GEAR

CROSS-REFERENCE TO RELATED APPLICATION

This application claims the benefit of Taiwan Patent Application No. 099125161 filed on Jul. 29, 2010, which is hereby incorporated by reference for all purposes as if fully set forth herein.

BACKGROUND OF THE INVENTION

1. Field of Invention

The present invention relates to an automotive engine idle speed control system and method, and more particularly to an engine idle speed control system and a method for a vehicular gear applicable to vehicular gear engines in which an idle speed system is combined with an electronic controller.

2. Related Art

FIG. 1 is a schematic view of an architecture of an idle speed control system for a motorcycle in the prior art. In the prior art, to reduce fuel consumption when the motorcycle pauses and to extend the use life of all parts, an idle speed control system is configured for the motorcycle.

When a rider turns on a master key switch of the motorcycle so all parts are powered by a battery 19 and presses a starter switch 18 to actuate the motorcycle, an electronic controller 10 analyzes motorcycle operation information such as an engine revolution speed provided by an engine revolution speed sensor 13, a motorcycle speed provided by a vehicle speed sensor 11, a throttle position provided by a throttle position sensor 12, an engine temperature value provided by an engine temperature sensor 14 and a battery voltage value provided by a voltage sensor 15, so as to stop the operation of a spark plug 161 to stop the engine 17 when it is determined that all operation information meet an idle speed stop condition. Once the rider operates a throttle handle to raise a throttle position, the electronic controller 10 enables a starter motor 162 to operate and enables the spark plug 161 to ignite to actuate the engine 17.

However, no relevant techniques such as an idle speed control system or apparatus is available for the conventional shifting motorcycle. The above structure is only applicable to a scooter type vehicle. The architecture of the clutch and the gear of the vehicle requires the rider to control and switch gears, so the throttle position cannot be directly sensed to implement the idle speed control mechanism as the conventional shifting motorcycle.

Next, in the action of starting the engine through the throttle operation, the air intake amount of the engine changes with the throttle position which is different from the start mode that the throttle is preset to be off, so the engine cannot start at an optimal air fuel ratio. On the contrary, the fuel consumption is increased and meanwhile the engine is worn and not easy to start. Also, if the throttle operation of the vehicle is excessively large, when the engine is being started, unexpected dangers such as sudden acceleration, engine stop, part burnout may occur, which result in dangers to the rider.

Therefore, the manufacturers need to consider how to provide a safe engine idle speed control technology that is effectively applicable to the vehicle.

SUMMARY OF THE INVENTION

The present invention is directed to an engine idle speed control system and method for a vehicular gear, which is safe and applicable to a shifting vehicle by combining a clutch and a gear mechanism.

To solve the above problems of the system, the present invention discloses an engine idle speed control system for a vehicular gear, which comprises an electronic controller, an engine, a battery, a starter switch electrically connected to the battery, a starter motor electrically connected to the starter switch and an ignition unit and a fuel supply unit connected to the engine. The engine has a gear mechanism and a clutch. The clutch is connected to a clutch lever. The electronic controller is connected to a vehicle speed sensor, a throttle position sensor and an engine revolution speed sensor. The clutch lever is provided with a node switch to provide a lever node control signal, the gear mechanism is provided with a gear node switch to provide a gear node control signal, and the electronic controller is electrically connected to the node switch of the clutch lever and the gear node switch of the gear mechanism, so as to control automatic idle speed stop and start of the engine.

In the engine idle speed control system for the vehicular gear according to the present invention, the vehicle further comprises a side stand node switch electrically connected to the electronic controller, and the electronic controller is used to control a forced idle speed stop of the engine when the side stand node switch is in a parking state.

In the engine idle speed control system for the vehicular gear according to the present invention, the vehicle further comprises a forced idle speed stop switch electrically connected to the electronic controller, and the electronic controller is used to control manual idle speed stop of the engine according to whether the forced idle speed stop switch is turned on.

In the engine idle speed control system for the vehicular gear according to the present invention, the fuel supply unit comprises a fuel pump and a fuel injector. The ignition unit comprises an ignition coil and a spark plug.

To solve the above problems of the method, the present invention discloses an engine idle speed control method for a vehicular gear, which comprises the following steps. An electronic controller judges operation information of the vehicle, controls idle speed stop of an engine, and restarts the engine. The control method comprises the following step. When the electronic controller determines a vehicle speed is zero, a throttle position is a predetermined original value, the engine is in an idle speed state, content information of the acquired gear node control signal is neutral and content information of the clutch lever node control signal is "off", after a certain period, the electronic controller controls the automatic idle speed stop of the engine.

To solve the above problems of the method, the present invention discloses another engine idle speed control method for a vehicular gear, which comprises the following steps. An electronic controller judges operation information of the vehicle, controls idle speed stop of an engine, and restarts the engine. The control method comprises the following step. When the electronic controller determines that the vehicle speed is zero, a throttle position is a predetermined original value and the engine is in the idle speed state, content information of the acquired gear node control signal is neutral and content information of the clutch lever node control signal is "off", and the electronic controller determines that the side stand node switch is in a parking state, the electronic controller controls forced idle speed stop of the engine.

To solve the above problems of the method, the present invention discloses another engine idle speed control method for a vehicular gear, which comprises the following steps. An electronic controller judges operation information of a vehicle, controls idle speed stop of an engine, and restarts the engine. The control method comprises the following step.

When the electronic controller determining that the vehicle speed is zero, a throttle position is a predetermined original value, the engine is in an idle speed state, content information of the acquired gear node control signal is neutral and content information of the clutch lever node control signal is "off", and the electronic controller determines that a forced idle speed switch is turned on, the electronic controller controls manual idle speed stop of the engine.

In all the engine idle speed control methods for the vehicular gear of the present invention, when the engine is in a predetermined period of idle speed stop and the electronic controller determines that the content information of the clutch lever node control signal is "on", the electronic controller starts the engine. When the engine is in idle speed stop state and exceeds the predetermined period, the engine is not started unless a starter switch is pressed again.

The present invention has the advantages of being applicable to the shifting vehicles. If not all the operation information meets the idle speed stop condition, the engine does not enter the idle speed stop mode. Next, when the engine enters the idle speed stop mode, the electronic controller starts the engine according to the acquired lever node control signal without waiting for actuation of the throttle, so the rider does not feel stagnant and unsmooth. Subsequently, when the clutch is operated, the electronic controller actuates the engine instantly and finishes starting the engine before the throttle is actuated, that is starting the engine in the start state that the throttle is "off", so as to start the engine at the optimal air fuel ratio, thereby reducing the fuel consumption and meanwhile reducing engine wear and facilitating to start the engine. Moreover, the unexpected dangers such as the sudden acceleration, engine stop and part burnout do not occur to the vehicle as the throttle operation is too violent when starting the engine, thereby effectively improving the safety of the rider.

BRIEF DESCRIPTION OF THE DRAWINGS

The present invention will become more fully understood from the detailed description given herein below for illustration only, and thus are not limitative of the present invention, and wherein:

FIG. 6A, FIG. 6C and FIG. 6D are implemented at the same time according to an embodiment of the present invention;

FIG. 6F and FIG. 6G are implemented at the same time according to an embodiment of the present invention;

DETAILED DESCRIPTION OF THE INVENTION

The embodiments of the present invention are illustrated in detail with reference to the accompanying drawings as follows.

Figure 1:
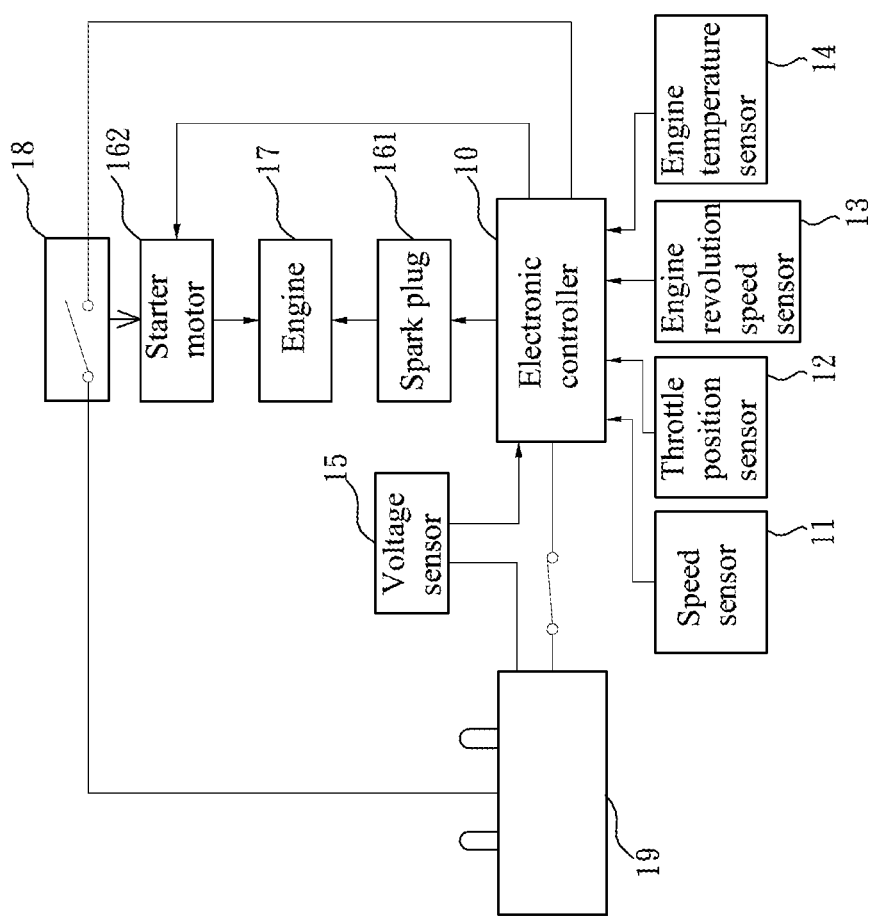
FIG. 1 is a schematic view of an architecture of an idle speed control system of an motorcycle in the prior art.
Figure 2:
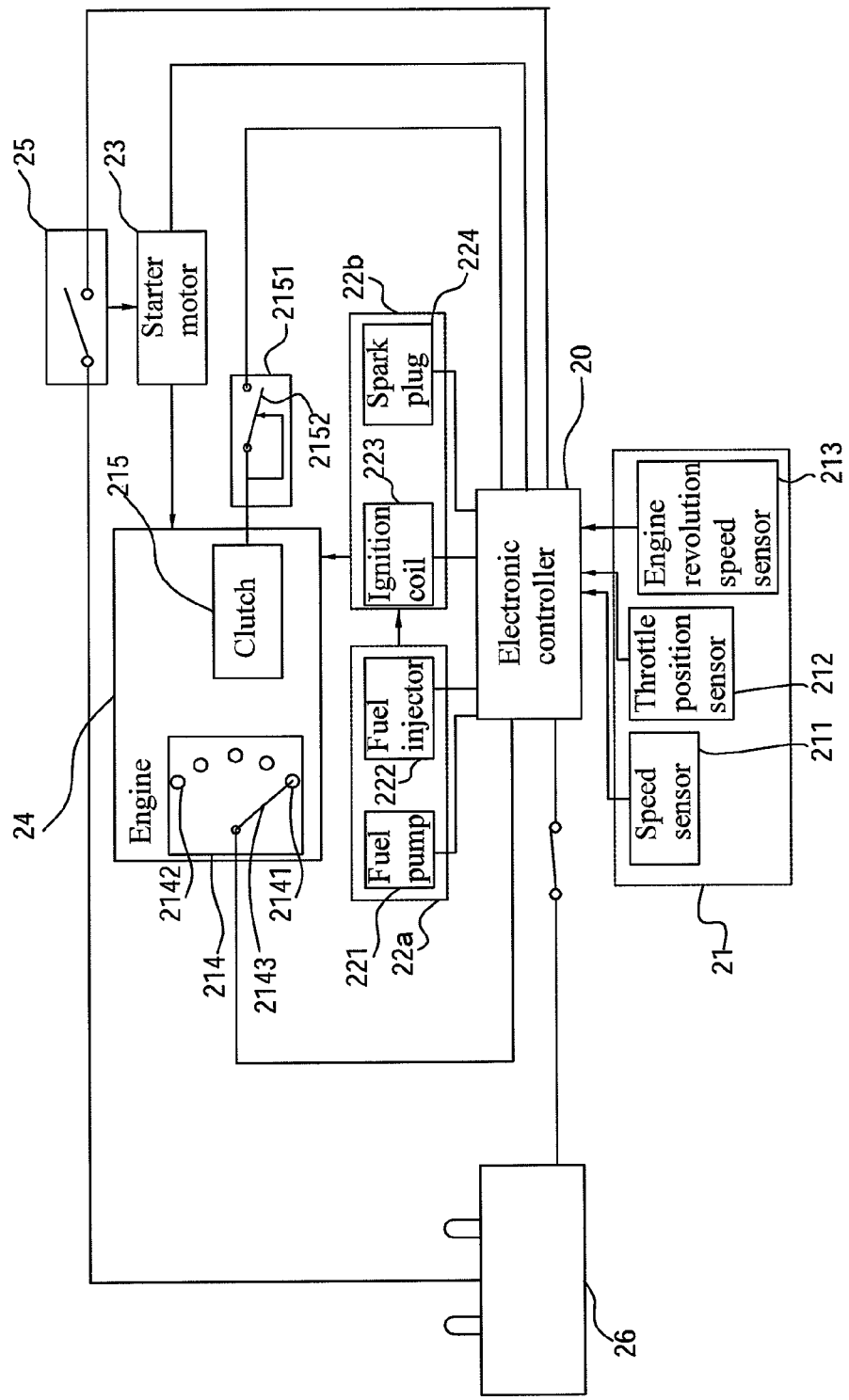
FIG. 2 is a schematic view of a first architecture of an engine idle speed control system for the vehicular gear according to an embodiment of the present invention.
Figure 3:
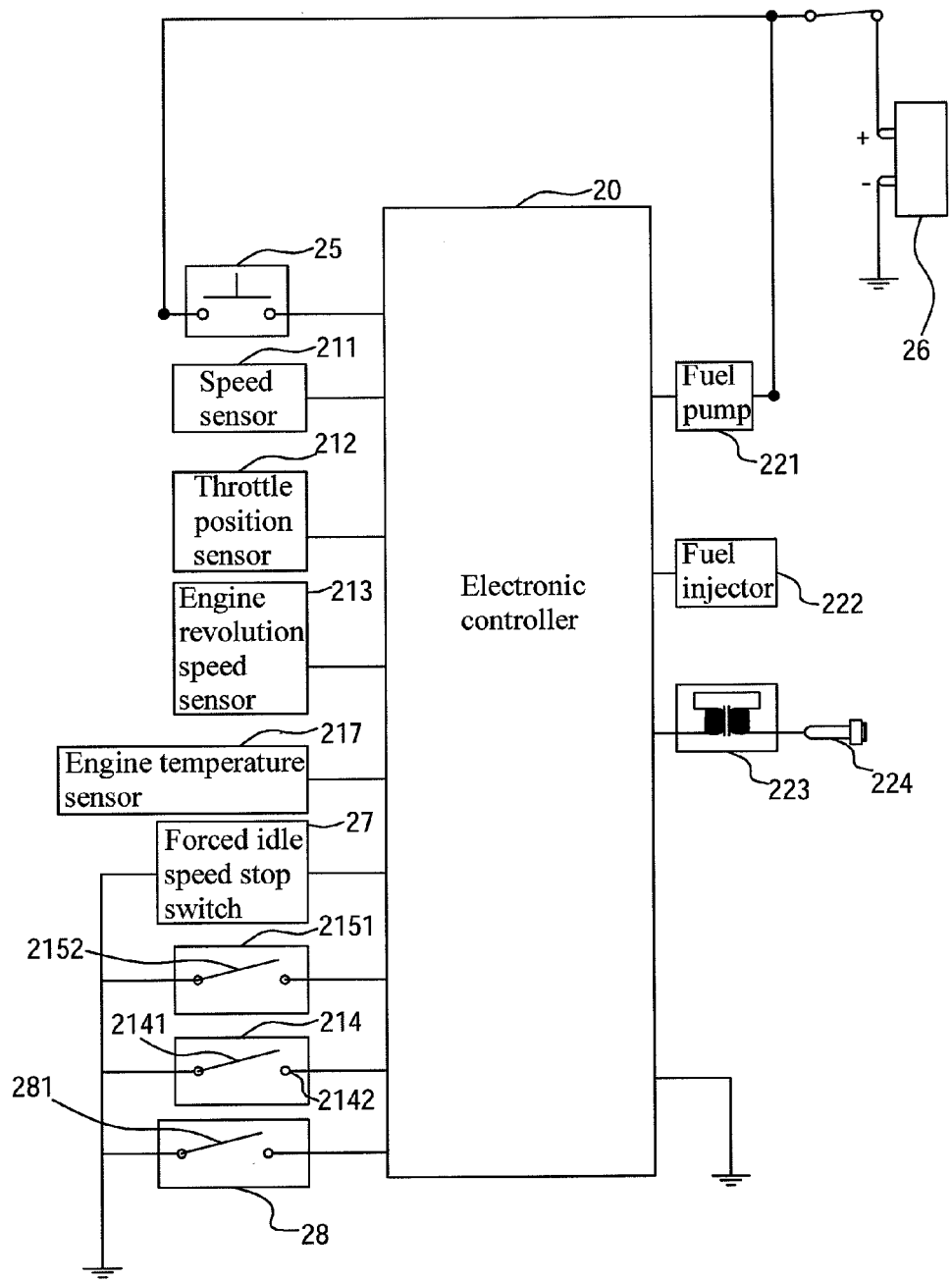
FIG. 3 is a schematic view of an architecture of circuit connection of an electronic controller according to an embodiment of the present invention.

FIG. 2 is a schematic view of a first architecture of an engine idle speed control system for the vehicular gear according to an embodiment of the present invention and FIG. 3 is a schematic view of an architecture of circuit connection of an electronic controller according to an embodiment of the present invention. The electronic controller 20 controls and communicates with all electronic parts of the vehicle, and the electronic controller 20 is an electronic control unit (ECU) or relevant controllers.

A battery 26 of the vehicle is electrically connected to a starter switch 25, and the starter switch 25 is then electrically connected to a starter motor 23. An engine 24 of vehicle is connected to an ignition unit 22b, a fuel supply unit 22a and the starter motor 23. The engine 24 includes a gear mechanism 214 and a clutch 215. The clutch 215 is connected to a clutch lever 2151, and the clutch lever 2151 is provided with a node switch 2152. The gear mechanism 214 is provided with one or more gear nodes 2142 and includes a neutral gear node switch 2143. For ease of illustration, the neutral node 2141 is separated.

The electronic controller 20 is electrically connected to a number of operation sensing mechanisms 21 such as a vehicle speed sensor 211, a throttle position sensor 212 and an engine revolution speed sensor 213 and the fuel supply unit 22a and the ignition unit 22b, and is connected to a node switch 2152 of the clutch lever 2151 and a gear node switch 2143 of the gear mechanism.

After a master key switch of the vehicle starts, the battery 26 supplies system power, and the rider presses the starter switch 25 to actuate the vehicle, so all sensors start detecting the operation information of the vehicle. In this example, the fuel supply unit 22a includes a fuel pump 221 and a fuel injector 222. The ignition unit 22b includes an ignition coil 223 and a spark plug 224.

The vehicle speed sensor 211 is used to sense the vehicle speed. The throttle position sensor 212 is used to sense a throttle opening extent of the vehicle, which is the throttle position. The engine revolution speed sensor 213 is used to sense the current engine revolution. The gear mechanism 214 works in combination with the gear node switch 2143 to switch the vehicle gear. The clutch lever 2151 is provided for the rider to operate the clutch 215 to shift gears in combination with the gear mechanism 214 (or referred to as a gear shifting behavior).

In the gear mechanism 214, the gear node switch 2143 and all the gear nodes 2142 are coaxial sector shapes, and the gear node switch 2143 is a metal sheet that is pivoted about the axis of the sector. All the gear nodes 2142 and the neutral node 2141 are located on the pivoting path of the metal sheet and at the same time the gear node switch 2143 is only connected to one node to provide a gear node control signal. The gear node control signal is received by the electronic controller 20 to acquire the gear of the gear mechanism 214. Therefore, when the gear node switch 2143 is connected to the neutral node 2141, the electronic controller 20 receives a gear node control signal with the content being neutral provided by the gear mechanism 214. Before gear shifting, the rider needs to operate the clutch lever 2151 connected to the clutch 215, and when the clutch lever 2151 is operated, a node switch 2152 configured on the clutch lever 2151 is triggered to emit a lever node control signal to the electronic controller 20, so that the electronic controller 20 learns that the rider intends to shift gears.

The electronic controller 20 is used to receive vehicle operation information provided by the above sensors, so as to determine if the above operation information meets an engine idle speed stop condition. For example, the engine idle speed stop condition includes the following. (1) The electronic controller 20 determines the vehicle speed (or a wheel speed) sensed by the vehicle speed sensor 211 is zero, that is, the vehicle is in a stationary state. (2) The throttle position sensed by the throttle position sensor 212 needs to reach a predetermined original value, that is, the rider does not actuate the throttle. (3) The engine 24 is in the idle speed state, that is, the engine revolution sensed by the engine revolution speed sensor 213 needs to be smaller than the idle speed revolution, for example, the engine revolution speed 2000 RPM (2000 Revolutions Per Minute). (4) The gear mechanism 214 is in the neutral position, that is, the gear node switch 2143 is switched to be connected to the neutral node 2141, a gear node control signal with the content being neutral is provided to the electronic controller 20, the electronic controller 20 then receives and analyzes the gear node control signal to learn that the gear mechanism 214 is at the neutral gear. (5) The clutch 215 is not operated in a period, for example, the rider releases the clutch for at least 3 seconds, that is, in 3 seconds, the clutch lever 2151 is not operated by the rider, the electronic controller 20 does not receive the lever node switch signal emitted by the node switch 2152 of the clutch lever 2151 after being triggered.

When the vehicle pauses, if the operation information meets the above engine idle speed stop condition, the electronic controller 20 waits a predetermined period (for example, 3 seconds), the operation of the fuel supply unit 22a or the ignition unit 22b, that is, at least one of the fuel pump 221, the fuel injector 222, ignition coil 223 and the spark plug 224, is stopped, or the operation of both the fuel supply unit 22a and the ignition unit 22b is stopped to stop the engine 24. In this manner, if the rider stops the vehicle but does not cut off the power of the vehicle, the electronic controller 20 automatically enters the idle speed stop mode in the period that the vehicle pauses, so as to reduce the energy consumption of the vehicle.

The predetermined period may coincide with the time that the rider releases the clutch lever 2151 connected to the clutch 215 to reduce the waiting period before the vehicle enters the idle speed stop mode. Furthermore, in the predetermined period, if the operation information changes, the electronic controller 20 recollects the operation information without stopping the engine 24.

Furthermore, if the rider mistakes the idle speed stop mode for the complete stop mode of the vehicle (the operation stop state of the engine 24 and all the relevant parts), the starter switch 25 can still be operated to actuate the vehicle. Here, the electronic controller 20 regards the start signal provided by the starter switch 25 as the control signal for wakening the engine 24. The electronic controller drives the fuel supply unit 22a, that is, the fuel pump 221 and the fuel injector 222 to perform the engine fuel supply operation and then drives the ignition unit 22b, that is, the ignition coil 223 and the spark plug 224 to perform an ignition operation on the fuel supplied by of the fuel supply unit 22a and meanwhile the starter motor 23 operates, so as to start the engine 24 to make the engine 24 to restore the operation state from the idle speed stop mode.

Figure 4:
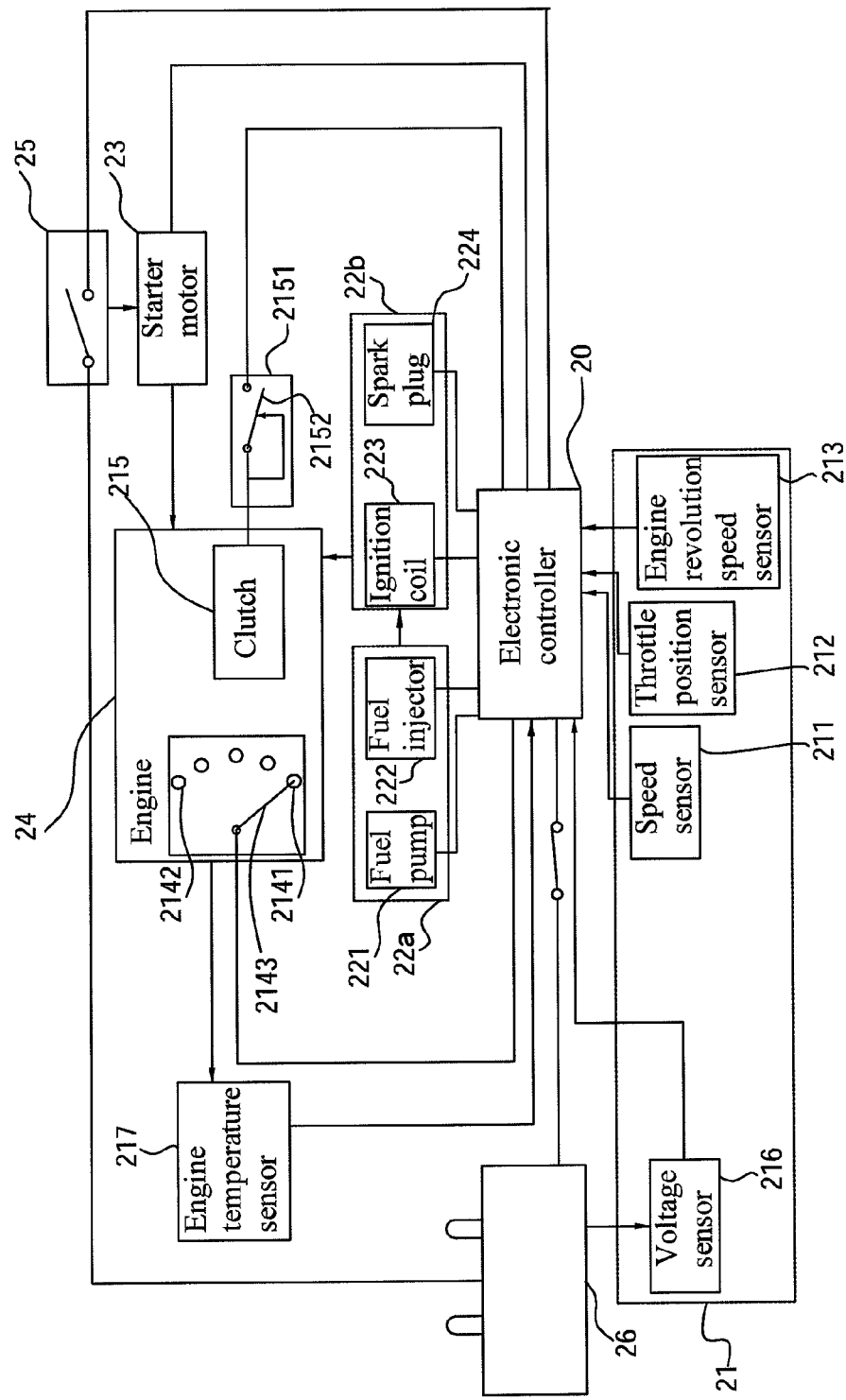
FIG. 4 is a schematic view of a second architecture of the engine idle speed control system for the vehicular gear according to an embodiment of the present invention.

FIG. 4 is a schematic view of a second architecture of the engine idle speed control system for the vehicular gear according to an embodiment of the present invention. Referring to FIG. 2, FIG. 3 and FIG. 4 together for ease of understanding, different from FIG. 2, the system architecture in this embodiment further includes a voltage sensor 216 and an engine temperature sensing module 217. The voltage sensor 216 is used to sense a voltage value of a battery 26 of the vehicle, and the engine temperature sensor 217 is used to sense an engine temperature of the engine 24 of the vehicle.

The electronic controller 20 first acquires the voltage value provided by the voltage sensor 216 and an engine temperature value provided by the engine temperature sensing module 217. When the electronic controller 20 determines that the voltage of the battery 26 is higher than a voltage lower threshold (for example, 11 V (Volts)), and the engine temperature is higher than a temperature lower threshold (for example, 60° C.), the electronic controller 20 determines that the engine idle determination operation can be performed. Next, if the electronic controller 20 determines that the operation information of the vehicle meets the above engine idle speed stop condition, the electronic controller 20 makes at least one or all of the fuel pump 221, the fuel injector 222, the ignition coil 223 and the spark plug 224 to stop operation, so as to make the engine 24 stop to automatically enter the idle speed stop mode.

Furthermore, after the engine 24 enters the idle speed stop mode, the electronic controller 20 still can continuously acquire the voltage value provided by the voltage sensor 216 and the engine temperature value provided by the engine temperature sensor 217. If the electronic controller 20 determines the voltage of the battery 26 is lower than a voltage lower threshold or the engine temperature is lower than a temperature lower threshold, it is determined that the vehicle enters the above complete stop mode. Even if the rider operates the clutch lever 2151 of the clutch 215, the electronic controller 20 also does not drive the fuel supply unit 22a and the ignition unit 22b, and also does not enable the starter motor 24 to operate, and the engine 24 does not restore the engine start state. The rider has to press the starter switch 25 again to actuate the engine 24.

Figure 5:
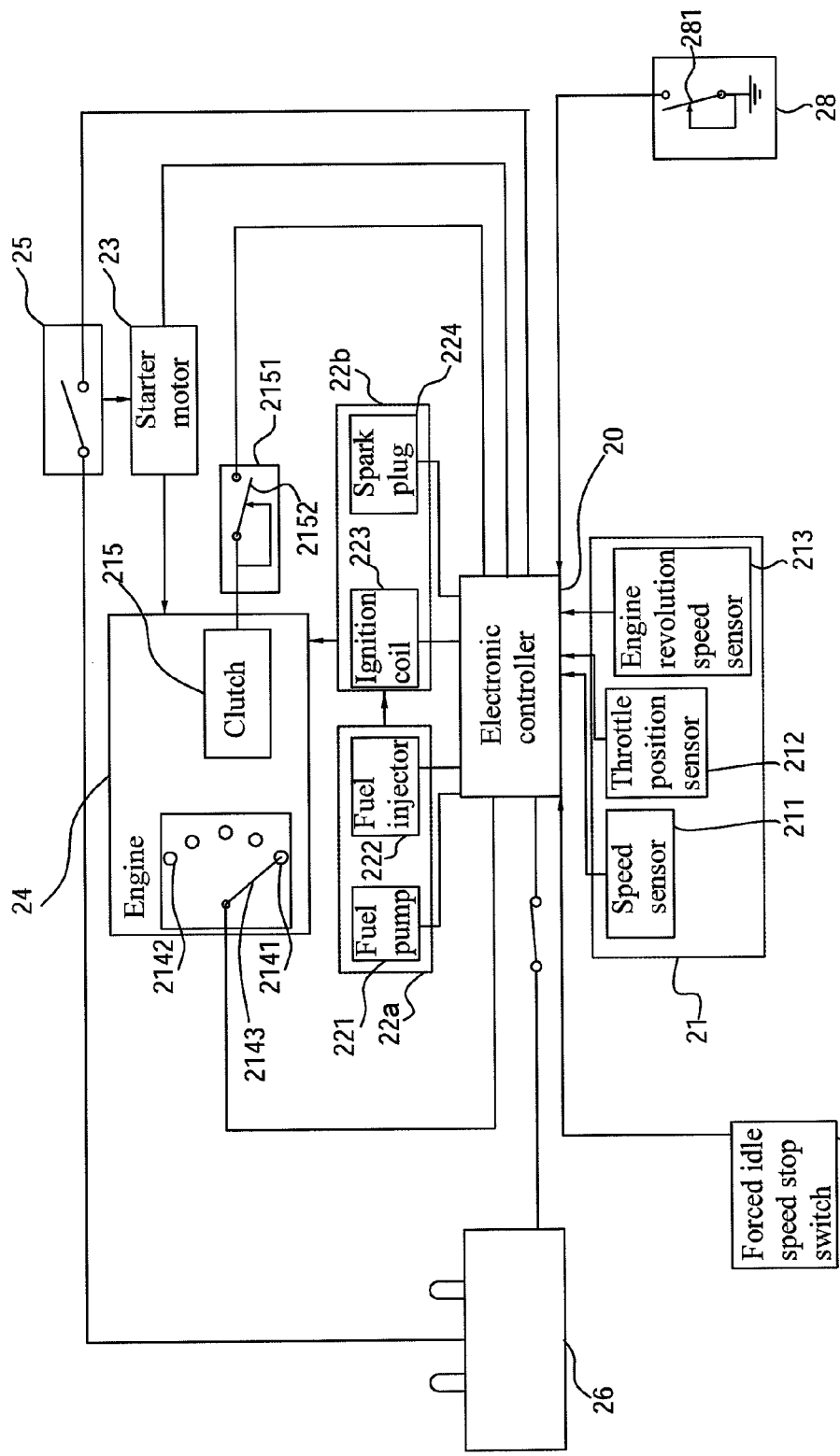
FIG. 5 is a schematic view of a third architecture of the engine idle speed control system for the vehicular gear according to an embodiment of the present invention.

FIG. 5 is a schematic view of a third architecture of the engine idle speed control system for the vehicular gear according to an embodiment of the present invention. Referring to FIG. 2-FIG. 4 together for ease of understanding, different from the above embodiments, the system in this embodiment has a forced idle speed stop switch 27 connected to the electronic controller.

When the forced idle speed stop switch 27 is activated, the electronic controller 20 acquires a forced idle speed stop signal from the forced idle speed stop switch 27. When the electronic controller 20 determines that the operation information of the vehicle meets the above engine idle speed stop condition, the electronic controller 20 stops the operation of at least one of the ignition unit 22b and the fuel supply unit 22a instantly without waiting the predetermined period, so that the engine 24 stops to enter an idle speed stop mode. It is noted here that the forced idle speed stop switch 27 is a button that the rider can easily press or a switch that the rider can turn on and off, which needs to be configured outside the vehicle for the rider to operate, so that the rider can turn on or turn off the forced idle speed stop switch 27 at any time, thereby finishing the requirements of manual control of the engine idle speed stop mode.

In another operation mode, the side stand mechanism 28 of the vehicle has a side stand node switch 281 connected to the electronic controller 20. When the side stand mechanism 28 is in the low position, the side stand node switch 281 is triggered to emit a side stand node control signal with the content information that the side stand node switch 281 is in the parking state. When the electronic controller 20 determines that the operation information of the vehicle meets the above engine idle speed stop condition, the electronic controller 20 stops the operation of at least one of the ignition unit 22b and the fuel supply unit 22a instantly without waiting a predetermined period, so that the engine 24 stops to enter an idle speed stop mode.

It is illustrated that the side stand node switch 281 presents the parking state when the side stand mechanism 28 is at the low position. When the side stand mechanism 28 is at a position (for example, a middle or high position) other than the low position, the side stand node switch 281 presents the non-parking state. In this embodiment, when the rider stops the vehicle temporarily and puts down the side stand mechanism to form the parking state, the side stand node switch 281 turns to an off state from the on state, and the electronic controller 20 forces the engine to stop immediately, thereby achieving the requirements for forcefully enter the idle speed stop mode once the vehicle is parked.

No matter which one of the idle speed control systems in FIG. 2 to FIG. 5 is adopted, when the engine 24 is in the predetermined period of the idle speed stop (for example, 20 minutes, but the present invention is not limited to thereto, and the period may be set by designers as required) and the rider intends to make the vehicle to move forward, the rider first operates the clutch lever 2151 connected to the clutch 215 and works in combination with the gear mechanism 214 to shift gears. During the period, the node switch 2152 is triggered to emit the node switch signal, the electronic controller 20 receives the above clutch lever node control signal and analyzes that the content is "on" to sense that the clutch 215 is operated. Next, the electronic controller 20 drives the fuel supply unit 22a, that is, the fuel pump 221 and the fuel injector 222 to perform an engine fuel supply operation, and then drives the drive ignition unit 22b, that is, the ignition coil 223 and the spark plug 224 to perform an ignition operation on the fuel supplied by the fuel supply unit 22a. Meanwhile, the starter motor 23 operates to start the engine 24, so that the engine 24 restores the engine start state from the idle speed stop mode. After the rider finishes the gear shifting operation and releases the clutch lever 2151 connected to the clutch 215, the vehicle moves forward.

However, when the engine 24 is in the idle speed stop state and the above predetermined period is exceeded, the electronic controller 20 regards that the vehicle has entered the complete stop state to release the idle speed stop but the engine 24 is not actuated. The rider needs to presses the starter switch 25 again and the starter switch 23 provides the start signal for the electronic controller 20 to receive. The electronic controller 20, after receiving the start signal, drives the fuel supply unit 22a, that is, the fuel pump 221 and the fuel injector 222 to perform the engine fuel supply operation, and drives the ignition unit 22b, that is, the ignition coil 223 and the spark plug 224 to perform the ignition operation on the fuel supplied by the fuel supply unit 22a, and at the same time, the starter motor 23 operates to start the engine 24.

However, the embodiments in FIG. 2 to FIG. 5 may be implemented separately or together, and the present invention is not limited thereto. Next, the voltage lower threshold, the lower threshold of the vehicle speed, the predetermined original value, the idle speed revolution, the time during which the clutch is not operated, and the predetermined waiting period of the electronic controller are not limited, and may be varied according to the actual requirements of the designers.

Figure 6A:
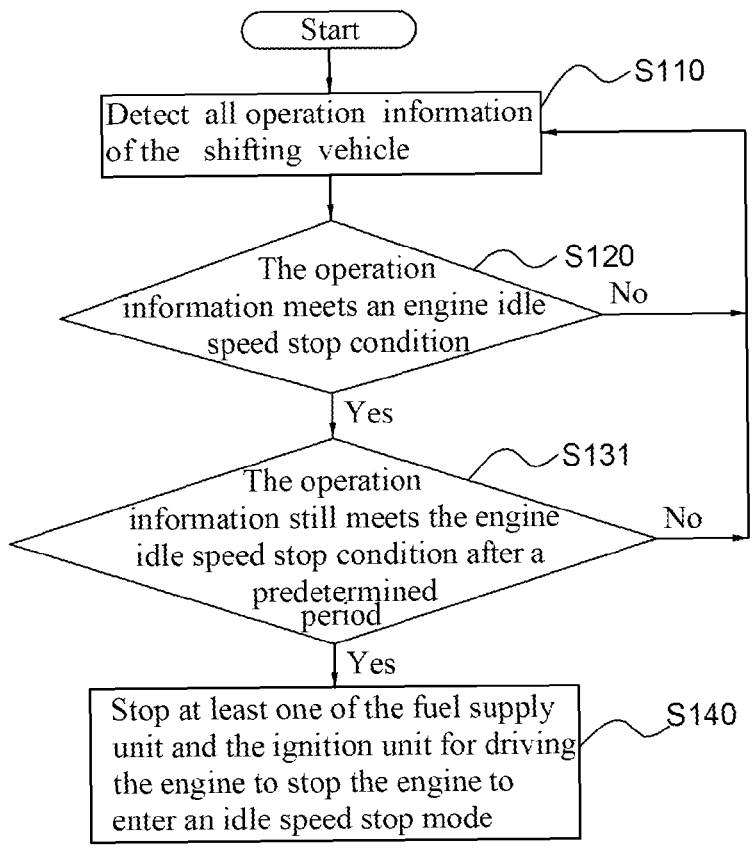
FIG. 6A is a schematic flow chart of first engine idle speed stop in the engine idle speed control method for the vehicular gear according to an embodiment of the present invention.
Figure 6B:
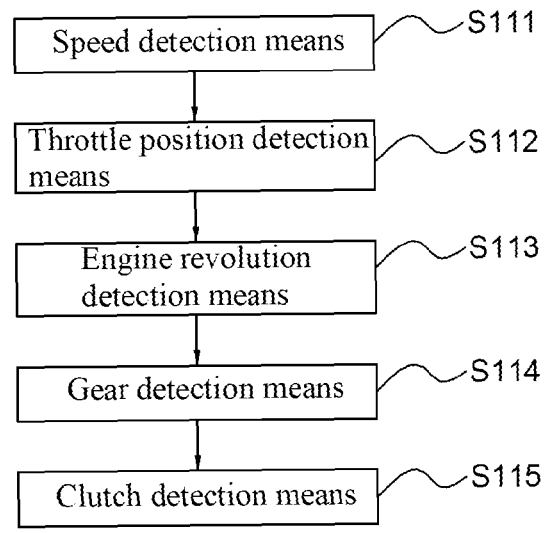
FIG. 6B is a schematic flow chart of vehicle state detection according to an embodiment of the present invention.

FIG. 6A is a schematic flow chart of first engine idle speed stop in the engine idle speed control method for the vehicular gear according to an embodiment of the present invention and FIG. 6B is a schematic flow chart of a vehicle state according to an embodiment of the present invention. In this method, an electronic controller judges the operation information of the shifting vehicle, controls the idle speed stop of the engine, and restarts the engine. Referring to FIG. 2 and FIG. 3 at the same time for ease of understanding, the control method is illustrated as follows.

All operation states of the vehicle are detected (step S110). Similar to FIG. 2 and FIG. 3, a battery 26 of the vehicle is electrically connected to a starter switch 25, and a starter switch 25 is then electrically connected to a starter motor 23. The engine 24 of the vehicle is connected to an ignition unit 22b, a fuel supply unit 22a and the starter motor 23. The engine 24 includes a gear mechanism 214 and a clutch 215, the clutch 215 is connected to a clutch lever 2151, and the clutch lever 2151 is provided with a node switch 2152. The gear mechanism 214 is provided with one or more gear nodes 2142 and includes a neutral gear node switch 2143. For simplicity, the neutral node 2141 is separated.

The electronic controller 20 controls and communicates with all the electronic parts of the vehicle, and the electronic controller 20 is an electronic control unit (ECU) or relevant controllers. The electronic controller 20 is electrically connected to a number of operation sensing mechanisms 21 such as a vehicle speed sensor 211, a throttle position sensor 212 and an engine revolution speed sensor 213 and the fuel supply unit 22a and the ignition unit 22b, and is connected to a node switch 2152 of the clutch lever 2151 and a gear node switch 2143 of the gear mechanism. After a master key switch of the vehicle is turned on, the battery 26 supplies the system power, and after rider presses the starter switch 25 to actuate the vehicle, all sensors start detecting vehicle operation information. In this example, the fuel supply unit 22a includes a fuel pump 221 and a fuel injector 222, and the ignition unit 22b includes an ignition coil 223 and a spark plug 224.

The detection steps in step S110 in FIG. 6B are not bound to a specific order and is only for the illustration purpose. In FIG. 6B, step S110 includes a number of detection steps as follows.

In the speed detection means (step S111), the vehicle speed sensor 211 senses the vehicle speed. In the throttle position detection means (step S112), the throttle position sensor 212 senses the throttle opening of the vehicle, that is, the throttle position. In the engine revolution detection means (step S113), the engine revolution speed sensor 213 senses the current revolution speed of the engine. In the gear detection means (step S114), the gear mechanism 214 works in combination with the gear node switch 2143 to shift the vehicle gears, and the electronic controller 20 is connected to the gear node switch 2143 to detect if the content of the acquired gear node control signal is neutral. The gear mechanism 214 is embedded with one or more gear nodes 2142, in which one is the neutral node 2141. The gear node switch 2143 and all the gear nodes 2142 are coaxial sector shapes and the gear node switch 2143 is a metal sheet that is pivoted about the axis of the sector. All the gear nodes 2142 and the neutral node 2141 are located on the pivoting path of the metal sheet and at the same time the gear node switch 2143 is only connected to one node to provide a gear node control signal. The gear node control signal is received by the electronic controller 20 to acquire the gear of the gear mechanism 214. Therefore, when the gear node switch 2143 is connected to neutral node 2141, the electronic controller 20 receives a gear node control signal with the content being neutral provided by the gear mechanism 214. In the clutch detection means (step S115), a clutch lever 2151 of the clutch 215 is provided for the rider to operate in combination with the gear mechanism 214 for a shifting behavior (or referred to as a gear shifting behavior). Before gear shifting, the rider needs to operate the clutch lever 2151 connected to the clutch 215, and when the clutch lever 2151 is operated, a node switch 2152 configured on the clutch lever 2151 is triggered to emit a lever node control signal to the electronic controller 20, so that the electronic controller 20 learns that the rider intends to shift gears.

The electronic controller 20 is used to receive vehicle operation information provided by the above sensors to determine whether the above operation information meets an engine idle speed stop condition (step S120). The engine idle speed stop condition includes the following. (1) The electronic controller 20 determines that the vehicle speed (or a wheel speed) sensed by the vehicle speed sensor 211 is zero, that is, the vehicle is in a stationary state. (2) The throttle position needs to reach the predetermined original value. (3) The engine 24 is in the idle speed state, that is, the engine revolution speed needs to be smaller than the idle speed revolution speed. (4) The gear mechanism 214 is in a neutral position, that is, the gear node switch 2143 is switched to be connected to the neutral node 2141, a gear node control signal with the content being neutral is provided to the electronic controller 20, and the electronic controller 20 then receives and analyzes the gear node control signal to learn that the gear mechanism 214 is at the neutral gear. (5) The clutch 215 is not operated in a period, for example, in 3 seconds, that is, in 3 seconds, the clutch lever 2151 is not operated by the rider, and the electronic controller 20 does not receive the lever node switch signal emitted by the node switch 2152 of the clutch lever 2151 after being triggered.

When the electronic controller 20 determines that the operation information meets the above engine idle speed stop condition, the electronic controller 20 determines whether the operation information still meets the engine idle speed stop condition after a predetermined period (step S131).

When the electronic controller 20 determines that the operation information does not meet the above engine idle speed stop condition, or in the predetermined period, the operation information changes and no longer meets the above engine idle speed stop condition, that is, step S110 is performed again.

On the contrary, when the electronic controller 20 determines that the duration exceeds the above predetermined period (for example, 3 seconds), the electronic controller 20 implements an engine stop control means, that is, stops driving at least one of the fuel supply unit 22a and the ignition unit 22b of the engine 24 to stop the engine 24 to automatically enter an idle speed stop mode (step S140).

Figure 6C:
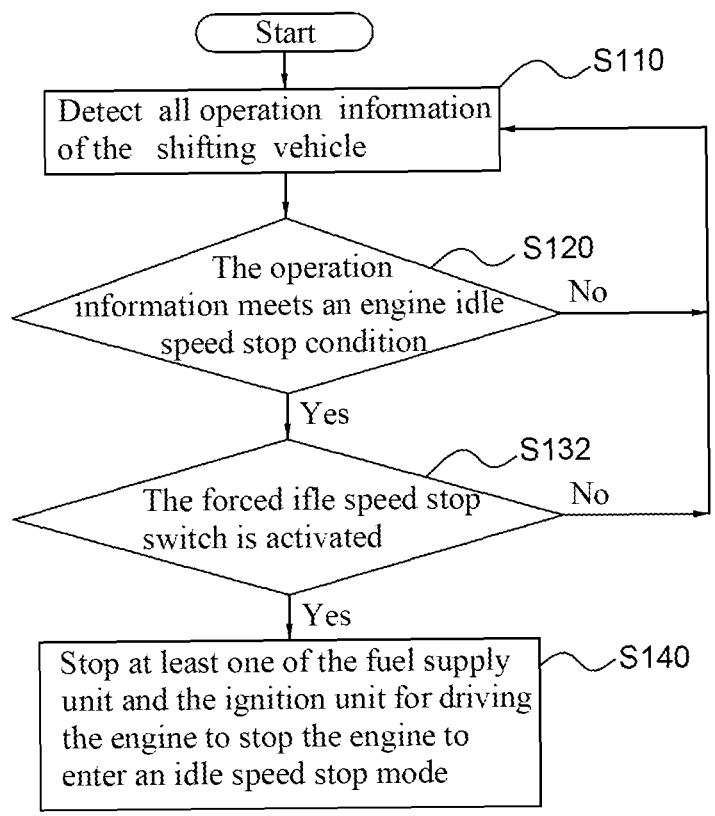
FIG. 6C is a schematic flow chart of second engine idle speed stop in the engine idle speed control method for the vehicular gear according to an embodiment of the present invention.

FIG. 6C is a schematic flow chart of second engine idle speed stop in the engine idle speed control method for the vehicular gear according to an embodiment of the present invention. Referring to FIG. 5 together, the determination steps in step S132 in FIG. 6C are different from those in the schematic flow chart of the first engine idle speed stop in FIG. 5.

When the electronic controller 20 determines that the operation information meets the above engine idle speed stop condition, the electronic controller 20 determines whether the forced idle speed stop switch 27 is on (step S132). When the electronic controller 20 determines that the forced idle speed stop switch 27 is on, the electronic controller 20 immediately implements an engine stop control means, that is, immediately stops driving at least one of the fuel supply unit 22a and the ignition unit 22b of the engine 24 without waiting a predetermined period to stop the engine 24 to enter an idle speed stop mode (step S140).

Figure 6D:
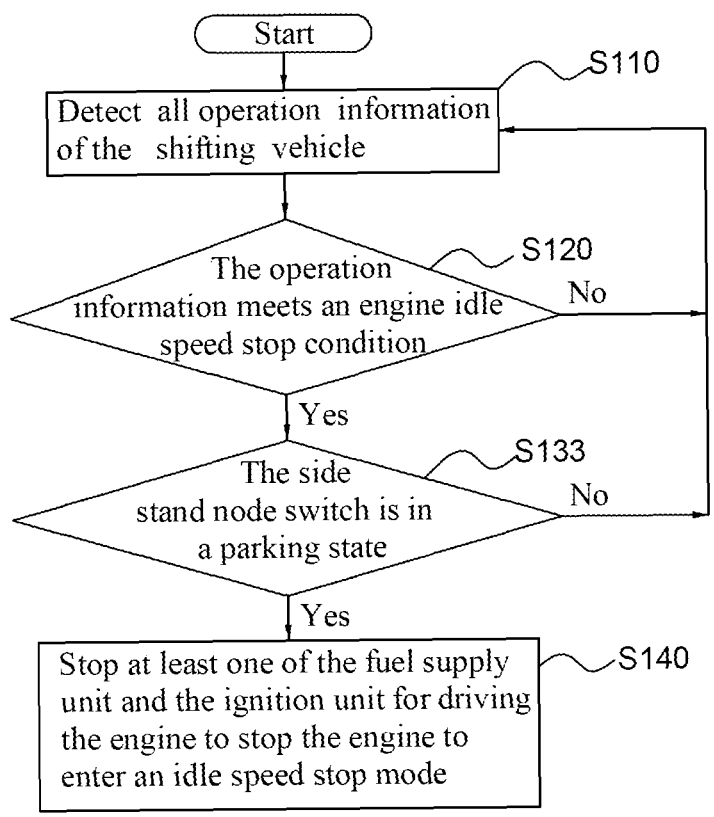
FIG. 6D is a schematic flow chart of third engine idle speed stop in the engine idle speed control method for the vehicular gear according to an embodiment of the present invention.

FIG. 6D is a schematic flow chart of third engine idle speed stop in the engine idle speed control method for the vehicular gear according to an embodiment of the present invention. Referring to FIG. 5 together, the determination steps in step S133 are different from the above schematic flow charts of the engine idle speed stop.

When the electronic controller 20 determines that the operation information meets the above engine idle speed stop condition, the electronic controller 20 determines whether a side stand node switch 281 is in the parking state (step S133). The above side stand mechanism 28 includes the side stand node switch 281. When the side stand mechanism 28 is at the low position, the side stand node switch 281 is triggered to emit a side stand node control signal with content information being that the side stand node switch 281 is in the parking state. When the electronic controller 20 acquires the side stand node control signal to determine that the side stand node switch 281 is in the parking state, that is, the side stand mechanism 28 is at the low position instead of the middle or high position, the electronic controller 20 immediately stops driving at least one of the fuel supply unit 22a and ignition unit 22b of the drive engine 24 without waiting a predetermined period, so that the engine 24 stops and enters an idle speed stop mode (step S140).

Figure 6E:
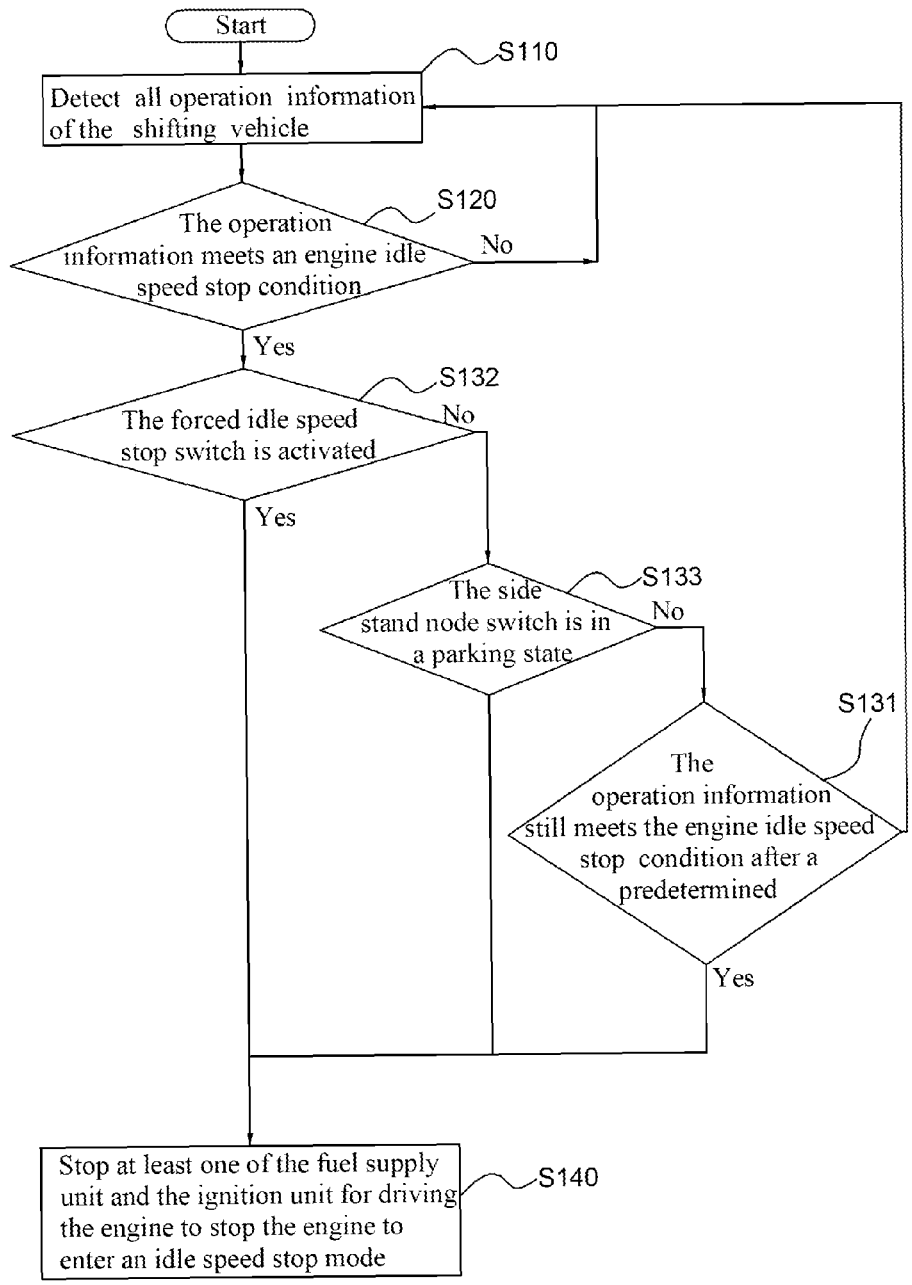
FIG. 6E is a schematic flow chart when

However, FIG. 6A to FIG. 6D may also be implemented separately or together. FIG. 6E is a schematic flow chart when FIG. 6A, FIG. 6C and FIG. 6D are implemented together according to an embodiment of the present invention. After step S120 is completed, the specific determination sequence of the step S132, step S133 and step S131 is used for determining whether to enter the idle speed stop mode, so as to ensure that the idle speed stop mode of the engine 24 is actuated.

Figure 6F:
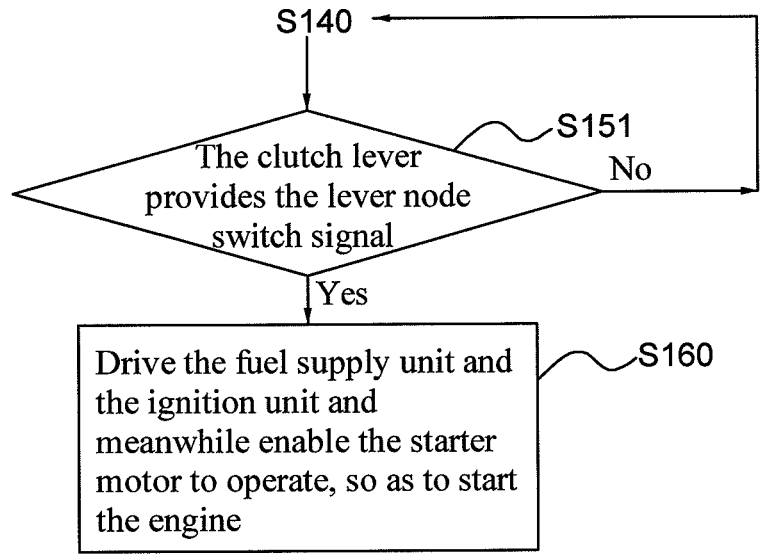
FIG. 6F is a schematic flow chart of first engine start in the engine idle speed control method for the vehicular gear according to an embodiment of the present invention.

FIG. 6F is a schematic flow chart of first engine start in the engine idle speed control method for the vehicular gear according to an embodiment of the present invention. FIG. 6F follows the idle speed stop operation implemented separately through any technology in FIG. 6A, FIG. 6C or FIG. 6D or implemented together through a number of technologies in FIG. 6E. Refer to FIG. 2 at the same time for ease of understanding.

After step S140, the electronic controller 20 judges whether the lever node switch signal provided by the clutch lever 2151 is acquired (step S151). When the electronic controller acquires that the clutch is controlled to provide the lever node switch signal to judge that the clutch 215 is being operated, an engine restart control means is implemented. The electronic controller 20 drives the fuel supply unit 22a, that is, the fuel pump 221 and the fuel injector 222 to perform the engine fuel supply operation, and drives the ignition unit 22b, that is, the ignition coil 223 and the spark plug 224 to perform the ignition operation on the fuel supplied by the fuel supply unit 22a and meanwhile makes the starter motor 23 to operate, thereby starting the engine 24 (step S160), and the engine 24 restores the start state from the idle speed stop mode. After the rider finishes the gear shifting and releases the clutch lever 2151 connected to the clutch 215, the vehicle moves forward.

Figure 6G:
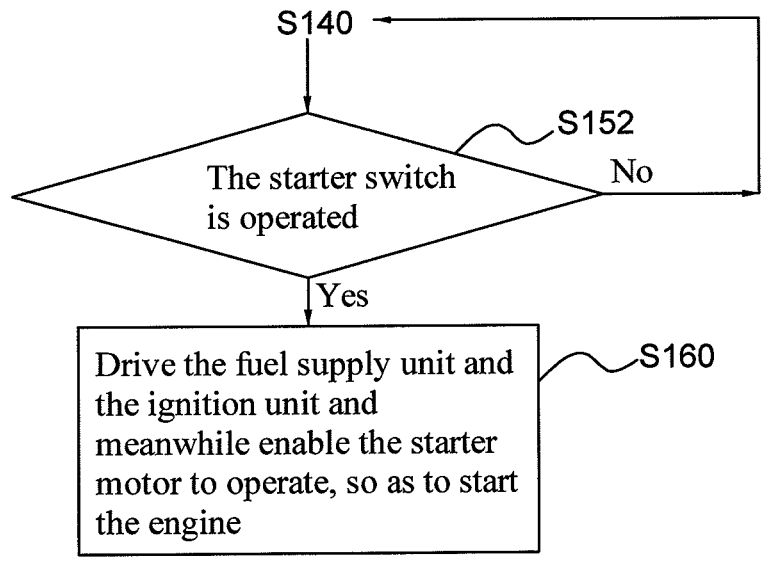
FIG. 6G is a schematic flow chart of second engine start in the engine idle speed control method for the vehicular gear according to an embodiment of the present invention.

FIG. 6G is a schematic flow chart of second engine start in the engine idle speed control method for the vehicular gear according to an embodiment of the present invention. FIG. 6G follows the idle speed stop operation implemented separately or together as in FIG. 6A, FIG. 6C or FIG. 6D. Refer to FIG. 5 together for ease of understanding.

After step S140, the electronic controller 20 judges whether the starter switch 25 is being operated (step S152). If the rider mistakes the idle speed stop mode for the completely stop mode of the vehicle (the operation stop state of the engine 24 and all relevant parts), a starter switch 25 may also be operated to actuate the vehicle. Here, the electronic controller 20 regards the start signal provided by the starter switch 25 as the control signal for weakening the engine 24 to drive the fuel supply unit 22a and the ignition unit 22b, and meanwhile the starter motor 23 runs, so as to start the engine 24 to restore the engine 24 to the start state from the idle speed stop mode (step S160).

Figure 6H:
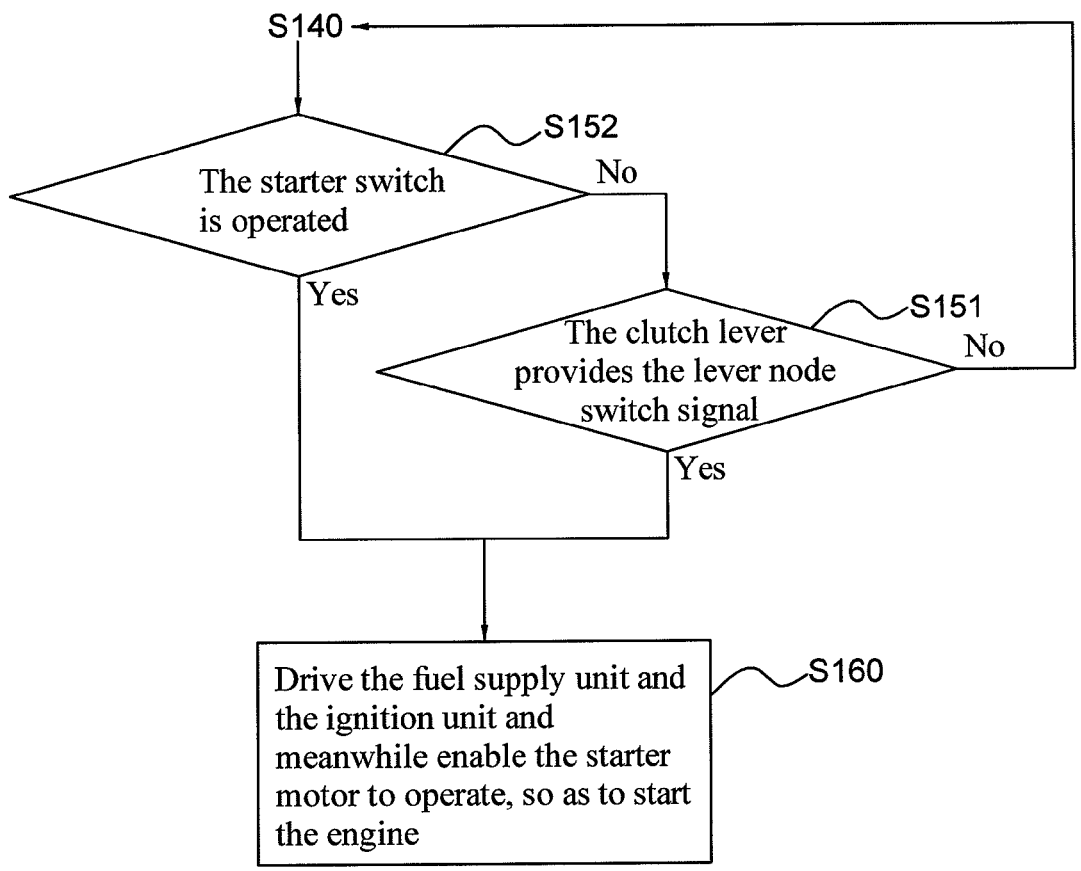
FIG. 6H is a schematic flow chart when

Next, after the processes in FIG. 6F or FIG. 6G are implemented, the procedure returns to step S110 to implement the vehicle operation information detection. FIG. 6F and FIG. 6G may be implemented in combination as illustrated in FIG. 6H.

Figure 7A:
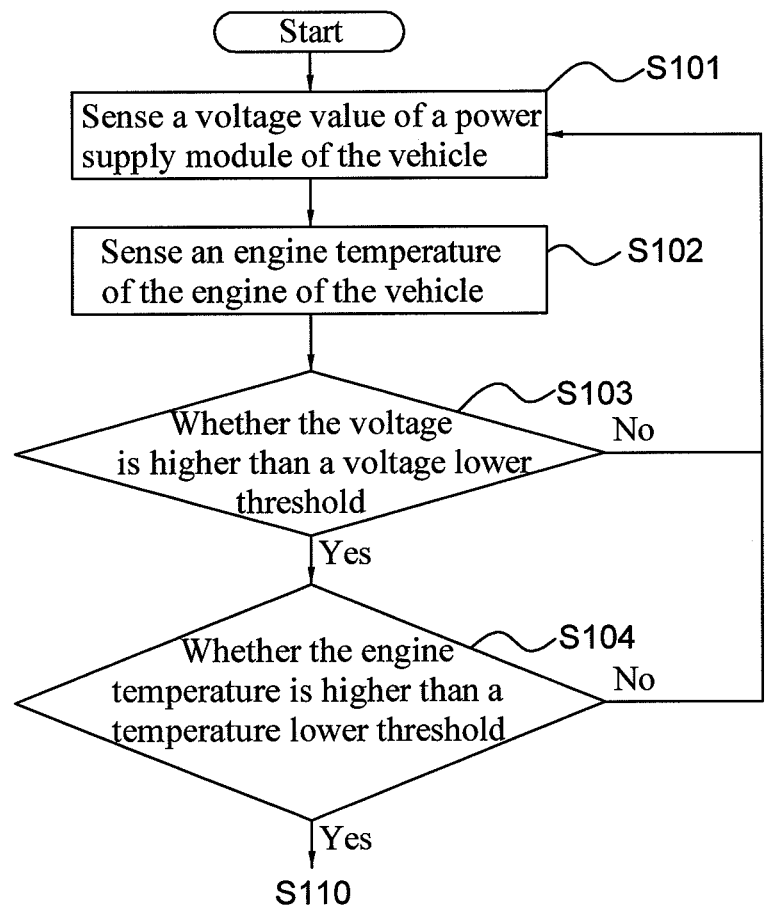
FIG. 7A is a schematic flow chart of pre judgment in the idle speed control method according to an embodiment of the present invention.

FIG. 7A is a schematic flow chart of pre judgment in the idle speed control method according to an embodiment of the present invention. Refer to FIG. 4 together for ease of understanding.

In FIG. 7A, before step S110, a power detection means and an engine temperature detection means are provided.

In the power detection means, a voltage sensor 216 senses a voltage of the battery 26 of the vehicle (step S101). In the engine temperature detection means, the engine temperature sensor 217 is used to sense the engine temperature of the engine 24 of the vehicle (step S102). After that, the electronic controller 20 acquires the voltage value provided by the voltage sensor 216 and the engine temperature value provided by the engine temperature sensing module 217.

Next, the electronic controller 20 judges whether the voltage value of the battery 26 is higher than a voltage lower threshold (step S103). If the voltage value is higher than a voltage lower threshold (for example, 11 V), the electronic controller 20 judges whether the engine temperature is higher than a temperature lower threshold (for example 60° C.) (step S104). When the electronic controller determines that the engine temperature is higher than a temperature lower threshold, step S110 is implemented.

On the contrary, if the voltage value is lower than the voltage lower threshold or the engine temperature is lower than the temperature lower threshold, the electronic controller 20 implements the power detection means and engine temperature detection means again, that is, step S101 and step S102. Furthermore, step S101 and step S102 are not bound to a specific sequence and are only for illustration purpose. The engine temperature detection means may also be carried out before the power detection means is carried out, or the both may be implemented at the same time.

Figure 7B:
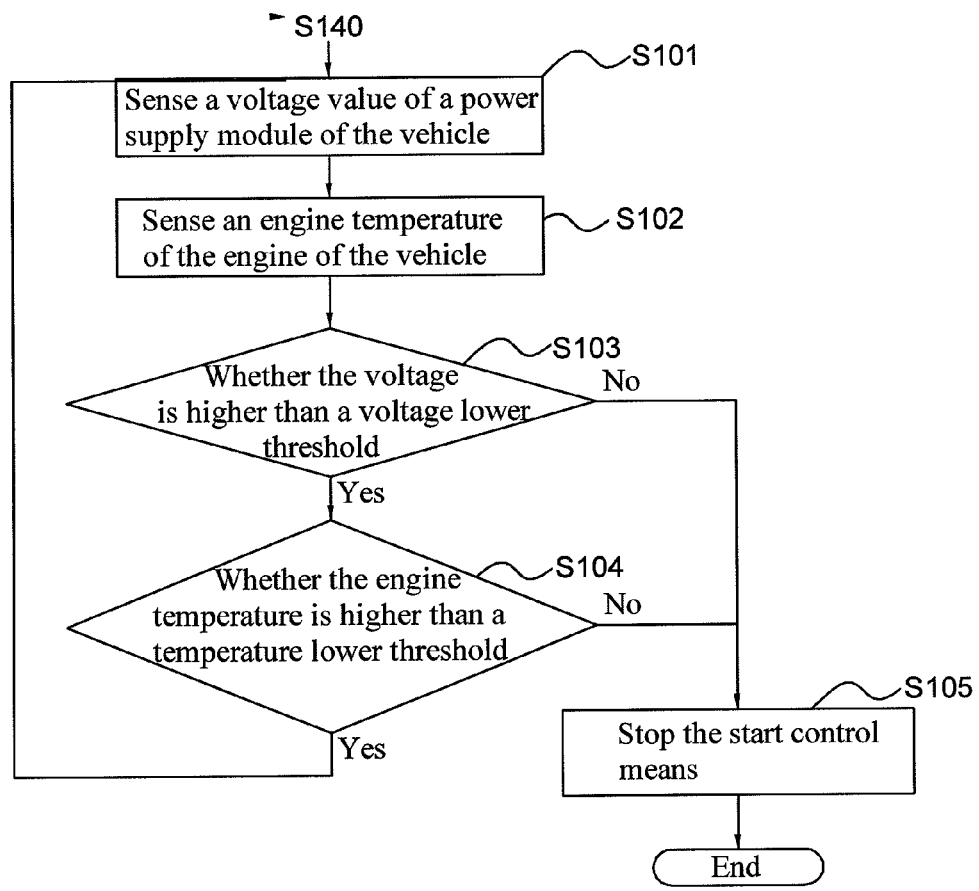
FIG. 7B is a schematic flow chart of post judgment in the idle speed control method according to an embodiment of the present invention.

FIG. 7B is a schematic flow chart of post-judgment in the idle speed control method according to an embodiment of the present invention. Refer to FIG. 4 together for ease of understanding.

In FIG. 7B, step S101 to step S104 may be implemented after step S140. Different from FIG. 7A, when the electronic controller 20 judges that the voltage is higher than a voltage lower threshold (for example 11V) and the engine temperature is higher than a temperature lower threshold, the engine 24 stays in the idle speed stop mode, that is, maintaining the implementation result in step S140.

On the contrary, if the voltage is lower than the voltage lower threshold or the engine temperature is lower than the temperature lower threshold, the electronic controller 20 determines that the vehicle has already entered the above complete stop mode and stops the subsequent restart control means (step S105), or the electronic controller 20 does not perform the engine start determination in step S151, step S152 and step S160.

Even if the rider operates the clutch, the electronic controller 20 does not drive the starter motor 24 to operate, and the engine 24 does not restore the engine start state. The rider has to press the starter switch 25 again to enable the electronic controller 20 to acquire the start signal, so as to actuate the engine 24 again.

Figure 8:
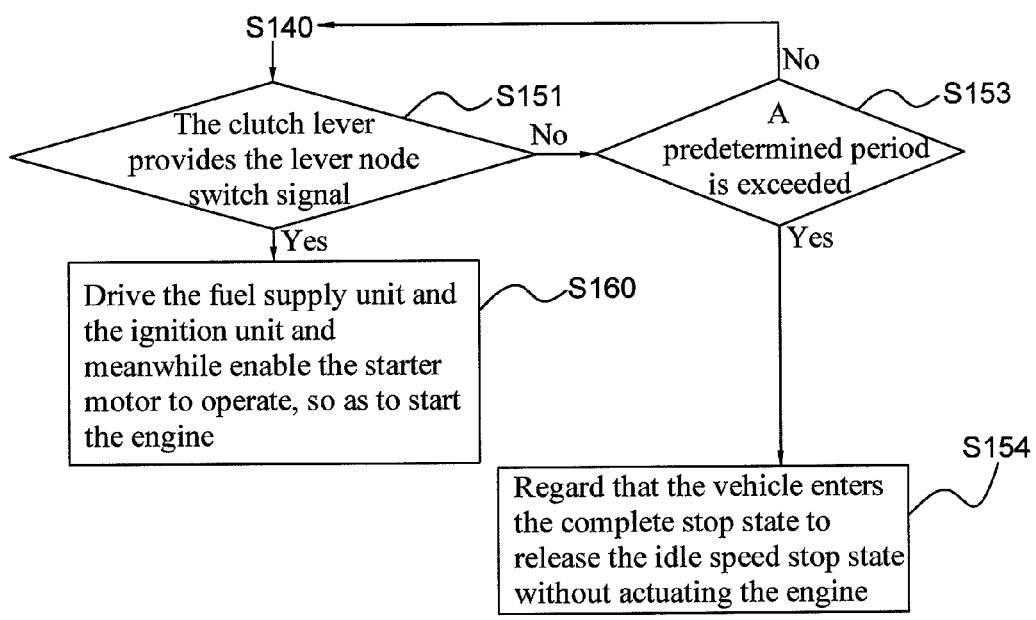
FIG. 8 is a schematic flow chart of waiting during idle speed time in the engine idle speed control method for the vehicular gear according to an embodiment of the present invention.

FIG. 8 is a schematic flow chart of waiting during idle speed time in the engine idle speed control method for the vehicular gear according to an embodiment of the present invention. Refer to FIG. 6F together for ease of understanding.

After step S140, the electronic controller 20 judges whether the lever node switch signal provided by the clutch lever 2151 is acquired (step S151). When the electronic controller 20 determines that the lever node switch signal is not acquired, the electronic controller 20 analyzes whether the engine enters the idle speed stop state and a predetermined period is exceeded (step S153).

If the electronic controller 20 determines that the predetermined period is not exceeded, that is, the procedure returns to step S140. On the contrary, if the engine 24 is in the idle speed stop state and the above predetermined period is exceeded, the electronic controller 20 regards that the vehicle enters the complete stop state to release the idle speed stop state without actuating the engine 24 (step S154). The rider needs to press the starter switch 25 again, so the starter switch 23 provides the start signal for the electronic controller 20 to receive, and the electronic controller 20 drives the fuel supply unit 22a after receiving the start signal, that is, the fuel pump 221 and the fuel injector 222 to perform an engine fuel supply operation, drives the ignition unit 22b, that is, the ignition coil 223 and the spark plug 224 to perform an ignition operation on the fuel supplied by the fuel supply unit 22a and meanwhile the starter motor 23 operates to start the engine 24. From step S151 and step S153, it is understood that when the engine stays in the predetermined period of the idle speed stop, the electronic controller 20 acquires the lever node switch signal provided by the clutch lever 2151 under control, so as to determine to implement an engine restart control means when the clutch 215 is being operated. The electronic controller 20 may drive the fuel supply unit 22a, that is, the fuel pump 221 and the fuel injector 222 to perform the engine fuel supply operation and drive the ignition unit 22b, that is, the ignition coil 223 and the spark plug 224 to perform the ignition operation on the fuel supplied by the fuel supply unit 22a and meanwhile enable the starter motor 23 to operate, thereby starting the engine 24 (step S160) to restore the engine 24 to the start state from the idle speed stop mode. After the rider finishes the gear shifting and releases the clutch lever 2151 connected to the clutch 215, the vehicle moves forward.

The above description is merely intended to illustrate the implementation or embodiments of technical solutions adopted for solving the problems according to the present invention rather than limiting the scope of the present invention. All the equivalent variations and modifications that are consistent with the meanings of the scope of the present invention or made according to the patent scope of the present invention shall fall within the patent scope of the present invention.

What is claimed is:

1. An engine idle speed control system for a vehicular gear, comprising an electronic controller, an engine, a battery, a starter switch electrically connected to the battery, a starter motor electrically connected to the starter switch, and an ignition unit and a fuel supply unit connected to the engine, wherein the engine has a gear mechanism and a clutch, the clutch is connected to a clutch lever, the electronic controller is connected to a vehicle speed sensor, a throttle position sensor and an engine revolution speed sensor, the clutch lever is provided with a node switch to provide a lever node control signal, the gear mechanism is provided with a gear node switch to provide a gear node control signal, and the electronic controller is electrically connected to the node switch of the clutch lever and the gear node switch of the gear mechanism, so as to control automatic idle speed stop and start of the engine, wherein the vehicle further comprises a side stand node switch electrically connected to the electronic controller, and the electronic controller is used to control forced idle speed stop of the engine when the side stand node switch is in a parking state, and wherein the vehicle further comprises a forced idle speed stop switch electrically connected to the electronic controller, and the electronic controller is used to control manual idle speed stop of the engine if the forced idle speed stop switch is turned on.

2. The engine idle speed control system for the vehicular gear according to claim 1, wherein the fuel supply unit comprises a fuel pump and a fuel injector, and the ignition unit comprises an ignition coil and a spark plug.

3. An engine idle speed control method for a vehicular gear, wherein an electronic controller judges operation information of a vehicle, controls idle speed stop of an engine and restarts the engine, and the control method comprising:

determining that a vehicle speed is zero, a throttle position is a predetermined original value, the engine is in an idle speed state, content information of an acquired gear node control signal is neutral and content information of a clutch lever node control signal is "off", and controlling automatic idle speed stop of the engine by the electronic controller after a predetermined period, when the engine is in a predetermined period of idle speed stop, determining that the clutch lever node control signal is "on" by the electronic controller, and starting the engine by the electronic controller, and when the engine is in an idle speed stop state and the predetermined period is exceeded, pressing a starter switch to start the engine.

4. An engine idle speed control method for a vehicular gear, wherein an electronic controller judges operation information of a vehicle, controls idle speed stop of an engine and restarts the engine, and the control method comprising:

determining that a vehicle speed is zero, a throttle position is a predetermined original value, the engine is in an idle speed state, content information of an acquired gear node control signal is neutral and content information of a clutch lever node control signal is a parking state, determining that a side stand node switch is "off", and controlling forced idle speed stop of the engine by the electronic controller, when the engine is in a predetermined period of idle speed stop, determining that the content information of the clutch lever node control signal is "on" by the electronic controller, and starting the engine by the electronic controller, and when the engine is in an idle speed stop state and the predetermined period is exceeded, pressing a starter switch to start the engine.

5. An engine idle speed control method for a vehicular gear, wherein an electronic controller judges operation information of a vehicle, controls idle speed stop of an engine and restarts the engine, and the control method comprises:

determining that a vehicle speed is zero, a throttle position is a predetermined original value, the engine is in an idle speed state, content information of an acquired gear node control signal is neutral and content information of a clutch lever node control signal is "off", and determining that a forced idle speed switch is turned on, controlling manual idle speed stop of the engine by the electronic controller, when the engine is in a predetermined period of idle speed stop, determining that the content information of the clutch lever node control signal is "on" by the electronic controller, and starting the engine by the electronic controller, and when the engine is in an idle speed stop state and the predetermined period is exceeded pressing a starter switch to start the engine.

* * * * *